Feb. 12, 1924.  1,483,404
J. WOZNIAK
SHIP'S SAFETY CABIN
Filed June 9, 1923
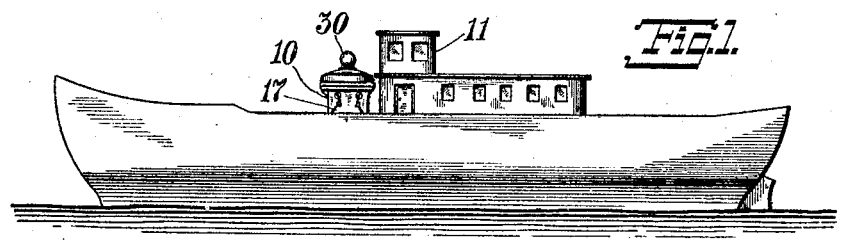
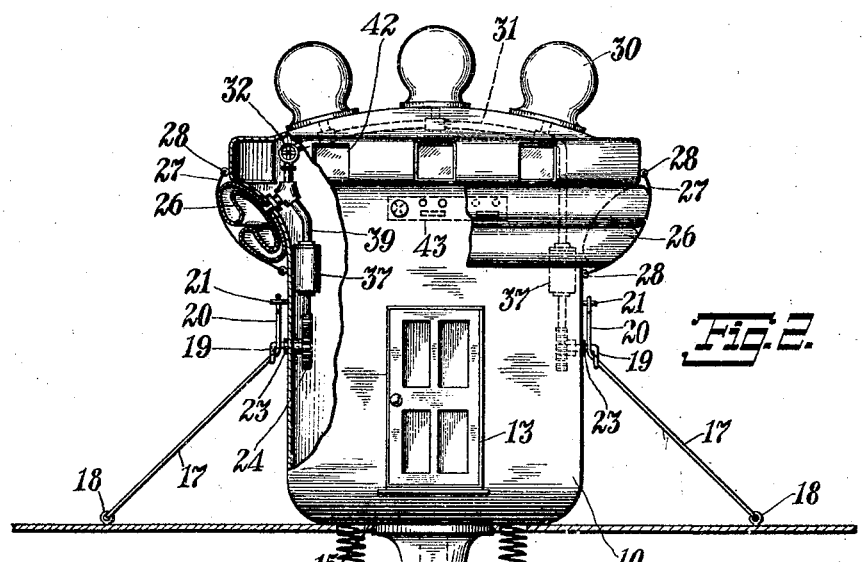
INVENTOR
John Wozniak.
BY
ATTORNEY Patented Feb. 12, 1924.

1,483,404

UNITED STATES PATENT OFFICE.

JOHN WOZNIAK, OF CHICAGO, ILLINOIS.

SHIP'S SAFETY CABIN.

Application filed June 9, 1923. Serial No. 644,311.

*To all whom it may concern:*

Be it known that I, JOHN WOZNIAK, a citizen of the United States, residing at Chicago, in the county of Cook and State of Illinois, have invented certain new and useful Improvements in Ships' Safety Cabins, of which the following is a specification.

This invention relates generally to safety equipment for ships, the invention having for an object to provide for the safety of the captain, who remains on the ship until the last, in the event of wreck.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a ship having the invention applied thereto.

Fig. 2 is a view part elevation and part vertical section, and taken transversely of the ship showing the captain's safety cabin.

Fig. 3 is a detail elevation of the releasing means for the tie ropes.

Fig. 4 is a plan view of the cabin.

My improved device comprises, briefly speaking, a cabin from which the captain may direct the ship, and which is designed to float off the ship as the latter sinks. This cabin is indicated generally at 10 and may be of a suitable size and of circular shape in plan view. This cabin is preferably located below and in front of the wheelhouse 11, resting upon the top deck 12 of the ship, and is constructed in any suitable manner to render it watertight, being provided with a watertight door 13. The cabin may be provided with a depending keelweight 14 which is accommodated in an opening 15 in the deck 12. The cabin may have side spaces divided off for the reception of food, water, etc., by partition elements 16.

The cabin is normally secured in place on the deck 12 by means of ropes 17 attached at one end to eyes 18 on the deck located at some distance from the cabin, the ropes 17 inclining upwardly toward the cabin, passing under rotary hooks 19 and then upward along the sides of the cabin and having rings 20 on their upper ends engaging over lugs 21 projecting from the cabin. The parts are so proportioned that when the hooks 19 are released from the ropes 17 the rings 20 will fail to grip the lugs 21 as the cabin leaves the deck when the ship sinks. The hooks 19 are formed on the outer ends of spindles 23 journaled in the sides of the cabin and having gear pinions 24 on their inner ends which are operated in a manner to be presently described.

To ensure against capsizing of the cabin when floating, I provide an annular air bag 26 of rubber or like material which surrounds the cabin a short distance below its roof and which is normally folded as indicated to lie snugly against the sides of the cabin, being held in folded position by frangible cords 27 secured to eyes 28. Mounted on the top of the cabin are a number of air drums 30 to which a suitably branched pipe 31 leads from the air bag 26. A hand valve 32 is provided on the pipe. The expansive force of the compressed air in the tanks 30 will be sufficient to break the cords 27 when the air is let into the bag 26.

The gear pinions 24 are adapted to be automatically rotated to release the hooks 19 from the ropes 17 when valve 32 is opened. To this end each pinion is engaged by a rack 35 on the end of a piston rod 36 projecting from a cylinder 37 to which air is supplied, behind the piston 38, through a pipe 39 branching from the pipe 31. A coiled expansion spring 40 in the cylinder normally holds the piston at the rear end thereof.

The cabin may have suitable portholes 42 therein and may be provided with a wireless apparatus indicated generally at 43.

In the event of shipwreck, when the ship is sinking, the valve 32 is opened, expanding the bag 26 and also causing the hooks 19 to be rotated to release the cabin.

To facilitate the freeing of the cabin from the ship I may provide a number of expansion springs 14' which bear upwardly on the cabin bottom suitable apertures in the deck 12 being provided to accommodate said springs.

Having thus described my invention what I claim as new and desire to protect by Letters Patent of the United States is as follows:

1. In a ship, a cabin resting freely on the deck thereof, a series of inclined tie ropes secured at one end to the deck and having rings on their opposite ends engaging over lugs on the cabin, and hooks releasably engaging said ropes below said lugs to hold said rings in engagement with said lugs.

2. In a ship, a cabin resting freely on the deck thereof, a series of inclined tie ropes secured at one end to the deck and having rings on their opposite ends engaging over lugs on the cabin, and hooks releasably engaging said ropes below said lugs to hold said rings in engagement with said lugs, and means located within the cabin for releasing all of said hooks in unison.

3. In a ship, a cabin resting freely on the deck thereof, a series of inclined tie ropes secured at one end to the deck and having rings on their opposite ends engaging over lugs on the cabin, and hooks releasably engaging said ropes below said lugs to hold said rings in engagement with said lugs, and means located within the cabin for releasing all of said hooks in unison, said means comprising gear pinions connected to said hooks, rack-toothed piston rods engaging said pinions, pistons on which said rods are mounted, cylinders in which said pistons are located, an air tank, and pipes leading to said cylinders from said air tank.

4. In a ship, a cabin resting freely on the deck thereof, releasable means securing said cabin to the deck, an annular air bag surrounding and connected to the cabin, an air tank carried by the cabin, a pipe leading from the tank to the said air bag, and a valve on said pipe, means adapted to operate automatically when said valve is opened to release said first means.

In testimony whereof I have affixed my signature.

JOHN WOZNIAK.